(12) United States Patent
Bao et al.

(10) Patent No.: US 12,077,378 B2
(45) Date of Patent: Sep. 3, 2024

(54) AUTOMATIC BOX TRANSFERRING SYSTEM

(71) Applicants: Tyco Electronics (Shanghai) Co., Ltd., Shanghai (CN); TE Connectivity Services GmbH, Schaffhausen (CH)

(72) Inventors: Xianghao (Jorge) Bao, Shanghai (CN); Lei (Alex) Zhou, Shanghai (CN); Dandan (Emily) Zhang, Shanghai (CN); Fengchun (Fred) Xie, Shanghai (CN); Roberto Francisco-Yi Lu, Bellevue, WA (US)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/718,764

(22) Filed: Apr. 12, 2022

(65) Prior Publication Data
US 2022/0324644 A1 Oct. 13, 2022

(30) Foreign Application Priority Data
Apr. 12, 2021 (CN) .......................... 202110391600.5

(51) Int. Cl.
*B65G 1/04* (2006.01)
(52) U.S. Cl.
CPC .................................. *B65G 1/0435* (2013.01)
(58) Field of Classification Search
CPC .. B65G 1/0435; B65G 1/0485; B65G 1/1373; G05B 19/41895; B62D 65/18
See application file for complete search history.

(56) References Cited

U.S. PATENT DOCUMENTS

| 10,850,962 | B2 | 12/2020 | Idsater |
| 2005/0276679 | A1* | 12/2005 | Frich .................... B65G 1/1378 414/273 |

(Continued)

FOREIGN PATENT DOCUMENTS

| CN | 205855247 U | 1/2017 |
| CN | 110697306 A | 1/2020 |

(Continued)

OTHER PUBLICATIONS

Chinese First Office Action dated May 11, 2023, with English translation thereof, corresponding to Application No. 202110391600.5, 13 pages.

*Primary Examiner* — Kaitlin S Joerger
(74) *Attorney, Agent, or Firm* — Barley Snyder

(57) ABSTRACT

A container transferring system autonomously transfers a container between a product processing machine and a container storage position. The system includes an automated guided vehicle (AGV) container transferring subsystem, and a machine side container conveying subsystem. The machine side conveying subsystem is arranged adjacent the product processing machine and receives empty containers from the AGV container transferring subsystem and transmits a full container to the AGV container transferring subsystem. The AGV container transferring subsystem docks with the machine side container conveying subsystem at a first docking position and moves autonomously between the first docking position and the container storage position to transport the empty container from the container storage position to the machine side container conveying subsystem, and transport the full container from the machine side container conveying subsystem to the container storage position.

18 Claims, 3 Drawing Sheets

(56) References Cited

U.S. PATENT DOCUMENTS

| | | | | |
|---|---|---|---|---|
| 2017/0158431 A1* | 6/2017 | Hamilton | | B65G 1/1375 |
| 2020/0198950 A1* | 6/2020 | Idsäter | | B66F 9/0755 |
| 2021/0101790 A1* | 4/2021 | Kilibarda | | B65G 1/0407 |
| 2022/0009712 A1* | 1/2022 | Kilibarda | | B65G 1/0407 |

FOREIGN PATENT DOCUMENTS

| | | |
|---|---|---|
| CN | 110914190 A | 3/2020 |
| CN | 211033939 U | 7/2020 |
| CN | 212655006 U | 3/2021 |
| WO | 2021067523 A1 | 4/2021 |

* cited by examiner

AUTOMATIC BOX TRANSFERRING SYSTEM

CROSS-REFERENCE TO RELATED APPLICATIONS

This application claims the benefit of Chinese Patent Application No. CN202110391600.5 filed on Apr. 12, 2021 in the State Intellectual Property Office of China, the whole disclosure of which is incorporated herein by reference.

FIELD OF THE INVENTION

Embodiments of the present disclosure generally relate to article transferring in industrial production, and more specifically, to an automatic box transferring system for conveying products or materials.

BACKGROUND

In some industrial production applications, in order to facilitate storage, transportation and management, boxes are used to repeatedly transport products or materials between different positions or machines. In normal operation, the box is usually handled by an operator. For example, the operator carries or temporarily stores the box between the storage position near the shelf or processing machine and the processing machine, and loads, unloads and exchanges the box to the processing machine. This transferring method has low efficiency and high labor cost.

SUMMARY

According to an embodiment of the present disclosure, a container transferring system autonomously transfers a container between a product processing machine and a container storage position. The system includes an automated guided vehicle (AGV) container transferring subsystem, and a machine side container conveying subsystem. The machine side conveying subsystem is arranged adjacent the product processing machine and receives empty containers from the AGV container transferring subsystem and transmits a full container to the AGV container transferring subsystem. The AGV container transferring subsystem docks with the machine side container conveying subsystem at a first docking position and moves autonomously between the first docking position and the container storage position to transport the empty container from the container storage position to the machine side container conveying subsystem, and transport the full container from the machine side container conveying subsystem to the container storage position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
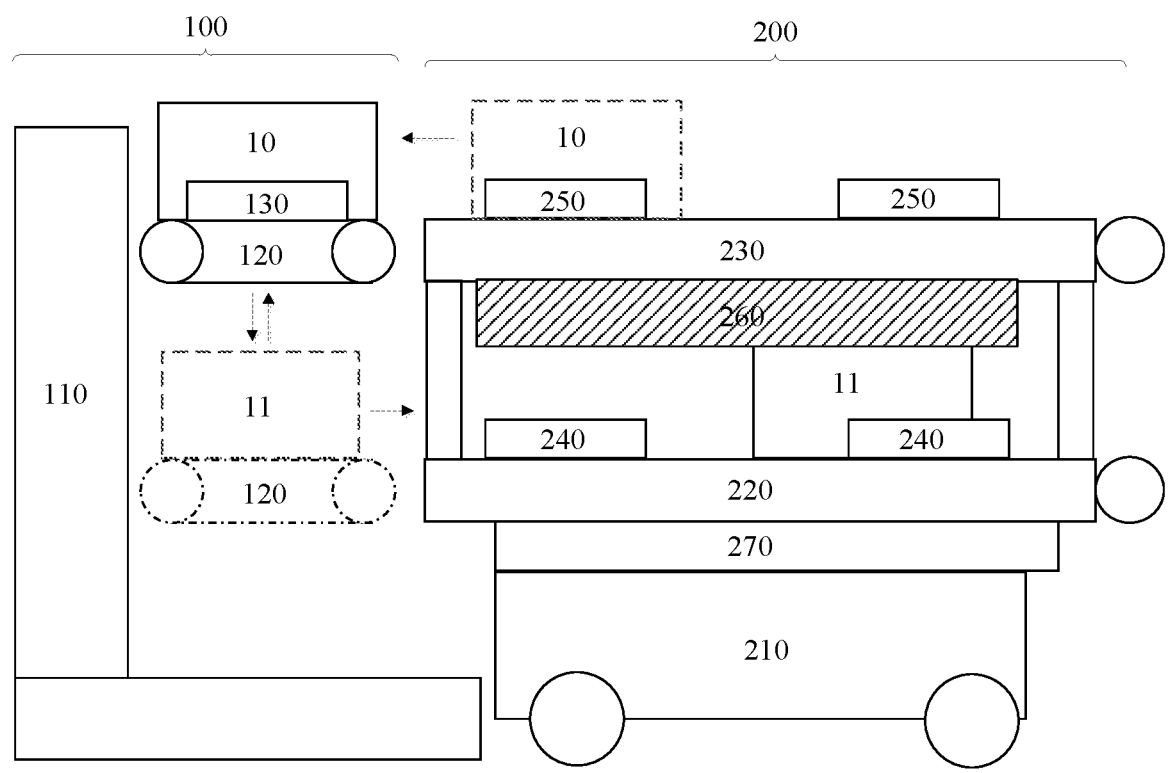
FIG. 1 is a side view schematically showing a box automatic transferring system according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, an automatic transferring system which is suitable for autonomously transferring containers (e.g., boxes as described herein) between a product processing machine and a box storage position. The box automatic transferring system comprises a machine side box conveying subsystem and an automated guided vehicle (AGV) box transferring subsystem. The machine side box conveying subsystem is adapted to be arranged near the product processing machine and configured to receive an empty box from the AGV box transferring subsystem and transmit a full box in which products processed by the product processing machine are collected to the AGV box transferring subsystem. The AGV box transferring subsystem is adapted to dock with the machine side box conveying subsystem at a first docking position and is configured to move autonomously between the first docking position and the box storage position to transport the empty box from the box storage position to the machine side box conveying subsystem and transport the full box from the machine side box conveying subsystem to the box storage position.

As shown in the figure, according to the exemplary embodiment of the present disclosure, there is provided a box automatic transferring system, which is suitable for autonomously transferring, loading, unloading and exchanging boxes between product processing machines (such as molding machines, injection molding machines, etc.) and warehouses, shelves or other box storage positions. The boxes can be used to contain materials or products processed by the product processing machines.

In the embodiment illustrated in FIGS. 1-4, the box automatic transferring system includes a machine side box conveying subsystem 100 and an AGV box transferring subsystem 200. The machine side box conveying subsystem 100 is suitable to be arranged near the product processing machine, such as for exchanging boxes with the product processing machine, such as providing empty boxes to the product processing machine and receiving full boxes from the product processing machine, and/or the machine side box conveying subsystem 100 may also be adapted to receive and hold the empty box to collect products from the product processing machine in the empty box, so that the operator is not required to perform load, unload, exchange and other operations between the box and the processing machine.

The AGV box transferring subsystem 200 is adapted to dock with the machine side box conveying subsystem 100 to exchange boxes between them. In some examples, after being docked, the machine side box conveying subsystem 100 can receive the empty box 10 from the AGV box transferring subsystem 200 and transfer the full box 11, in which the products processed by the product processing machine are collected or contained, to the AGV box transferring subsystem 200. In other examples, after being docked, the machine side box conveying subsystem can receive the full box loaded with materials from the AGV box transferring subsystem and transfer the full box from the product processing machine to the AGV box transferring subsystem to realize the transportation of materials.

It will be understood that in this article, the term "full box" only describes a box in which products or materials are loaded or contained, and does not necessarily require that it be fully filled with products or materials. The following describes the transferring of a box for loading products as an example.

In an exemplary embodiment, the AGV box transferring subsystem 200 is adapted to dock with the machine side box conveying subsystem 100 at a first docking position (e.g., a position near the machine side box conveying subsystem) and can move autonomously or controlled between the first docking position and the box storage position, to transport the empty box 10 from the box storage position to the machine side box conveying subsystem 100 and transport the full box 11 from the machine side box conveying subsystem 100 to the box storage position. Since the machine side box conveying subsystem and AGV box transferring subsystem can be used to directly and autonomously exchange boxes with the product processing machine, the box storage position can be located away from the product processing machine, such as warehouse or shelf, so as to keep the surrounding of the product processing machine clean and safe.

For example, in response to the absence of empty or full boxes in the machine side box conveying subsystem 100, the AGV box transferring subsystem 200 can autonomously move to the first docking position to dock with the machine side box conveying subsystem 100. For example, the machine side box conveying subsystem may be provided with a detector or sensor for detecting the presence or absence of an empty box or a full box, which sends a signal to the AGV box conveying subsystem via a signal transmitter when it senses that the machine side box conveying subsystem lacks the empty box or holds the full box. The AGV box transferring subsystem can move autonomously or controlled close to and dock with the machine side box conveying subsystem to realize the exchange of boxes.

The machine side box conveying subsystem 100 can receive the empty box 10 from the AGV box transferring subsystem 200 at the first position and transfer the full box 11 to the AGV box transferring subsystem 200 at a second position different from the first position, so that the box can be exchanged between the machine side box conveying subsystem and the AGV box transferring subsystem without interference. In the illustrated example, the heights of the second position and the first position are different from each other, such as the second position is lower than the second position. In other examples, the first position and the second position may relate to different horizontal positions.

In the exemplary embodiment shown in FIGS. 1-4, the machine side box conveying subsystem 100 includes a lift 110 and a box buffer 120. The lift 110 can move the box buffer 120 between the first position and the second position, and the box buffer 120 is used to receive and hold the empty box 10 from the AGV box transferring subsystem 200 and transfer the full box 11 to the AGV box transferring subsystem 200. In some examples, the box buffer may include a conveyor belt that can receive and hold one or more boxes.

For example, the box buffer 120 may hold the empty box 10 at the second position so that the empty box 10 located on the box buffer 120 can collect the products processed by the product processing machine and become the full box 11. For example, the empty box 10 held on the box buffer may be located near the product outlet or guide slot of the product processing machine to collect the products processed by the product processing machine.

As shown in FIGS. 1-4, a clamping mechanism 130 can be provided on the box buffer 120. The clamping mechanism 130 is used to maintain or fix the box at an appropriate position on the box buffer 120 to avoid movement of the box when collecting products or before being transferred to the AGV box transferring subsystem. For example, the clamping mechanism can be moved between a holding position where the clamping mechanism holds the box in place on the box buffer, and a release position where the clamping mechanism releases the box to facilitate the transport or transfer of the box to the AGV box transferring subsystem.

In some examples, the height or horizontal dimensions (e.g., length, width) of the lift or box buffer can be adjusted to accommodate different types or sizes of product processing machines.

Figure 4:
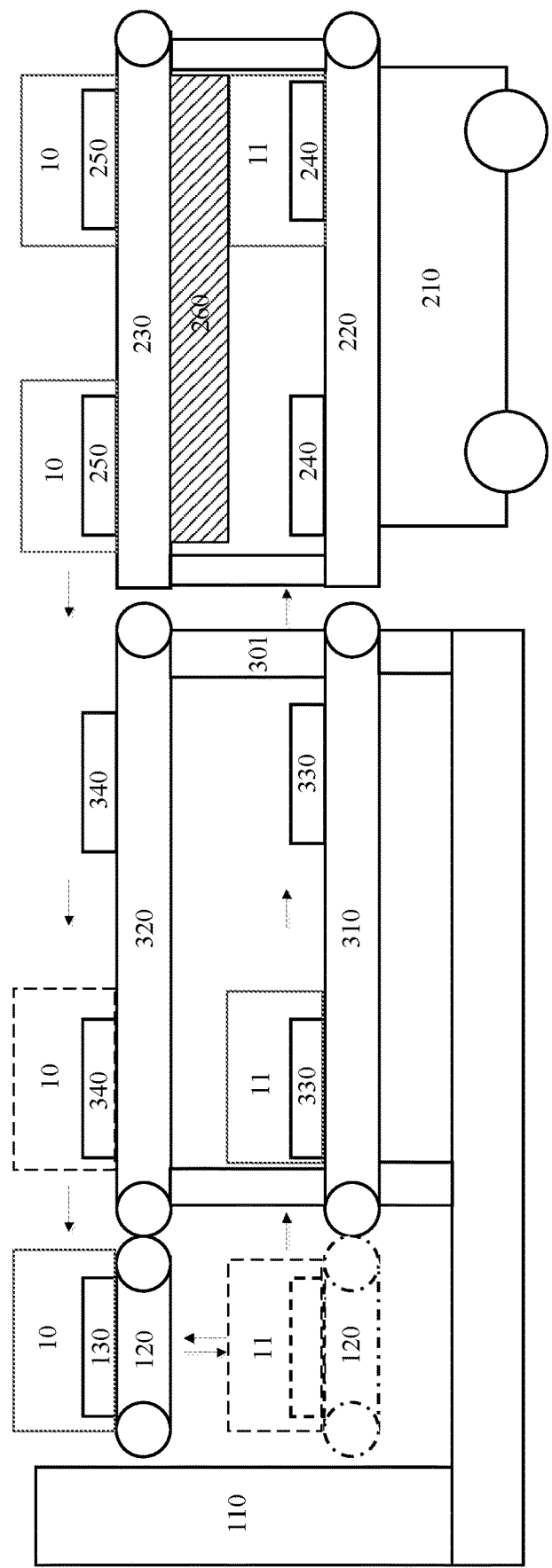
FIG. 4 is a side view schematically showing a box automatic transferring system according to an exemplary embodiment of the present disclosure.

In some exemplary embodiments, as shown in FIGS. 1 and 4, the AGV box transferring subsystem 200 includes an AGV module 210 and at least one box transport mechanism 220,230 mounted on the AGV module. The AGV module can move autonomously or controlled between the first docking position and the box storage position. The box transport mechanism 220,230 can carry and transfer the box on it. For example, the box transport mechanism 220,230 receives and holds the empty box 10 from the box storage position, transfers the empty box 10 to the machine side box conveying subsystem 100 at the third position, such as to the box buffer 120, and receives and holds the full box 11 from the machine side box conveying subsystem 100 or its box buffer 120 at the fourth position. Preferably, the third position is at approximately the same height as the first position, and the fourth position is at approximately the same height as the second position. The third position and the fourth position are the positions close to the machine side box conveying subsystem 200 or its box buffer 120 after the AGV box conveying subsystem is docked with the machine side box conveying subsystem. These positions are selected to facilitate unimpeded box transfer or exchange between the AGV box conveying subsystem and the machine side box conveying subsystem.

In the illustrated embodiment, as shown in FIGS. 1 and 4, the at least one box transport mechanism includes a first box conveyor belt 220 and a second box conveyor belt 230. The first box conveyor belt 220 is adapted to receive and hold the full box 11 from the machine side box conveyor subsystem 100, such as from the box buffer 120, at a fourth position. The second box conveyor belt 230 is adapted to transfer the empty box 10 to the machine side box conveying subsystem 100 at a third position, such as to the box buffer 120. It will be understood that the height or horizontal dimension (such as length and width) of the AGV box transferring subsystem can also be adjusted according to the size proportion of the machine side box conveying subsystem, or more box conveying mechanisms or box conveyor belts can be set. In the illustrated embodiment, the first box conveyor belt 220 and the second box conveyor belt 230 are spaced apart in the height direction, such as the first box conveyor belt 220 is positioned lower than the second box conveyor belt 230. In other examples, the first box conveyor belt and the second box conveyor belt may be spaced apart in the horizontal direction, or may be spaced apart both in the horizontal direction and the height direction.

One or more sensors may be provided on the box conveying mechanism to sense the presence or absence of the box on it. For example, one or more box positioning positions for placing the box may exist on each box conveying mechanism, and sensors may be provided for each box positioning position to sense the presence or absence of the box at the box positioning position. As shown in FIGS. 1 and 4, the first box conveyor belt 220 is provided with a first sensor 240 for sensing the presence of the full box 11 on the first box conveyor belt 220, and/or the second box conveyor belt 230 is provided with a second sensor 250 for sensing the presence or absence of the empty box 10 on the second box conveyor belt 230. When the sensor senses that there are boxes at all box positioning positions on the first box conveyor belt or the second box conveyor belt, the corresponding first box conveyor belt or the second box conveyor belt stops running to prevent the box from falling.

In some embodiments, as shown in FIGS. 1 and 4, the AGV box transferring subsystem 200 also includes a box cover 260 configured to cover the products in the full box 11 carried on the box transport mechanism. For example, the box cover 260 may be positioned above the first box conveyor belt 220, such as at a position separated from the first box conveyor belt 220 below the second box conveyor belt 230, to cover the products in the full box 11 on the first box conveyor belt 220.

The AGV box transferring subsystem 200 may also include a controller 270 (e.g., a processor and an associated memory device) adapted to control, for example, the autonomous movement of the AGV module 210, the operation of the box transport mechanisms 220, 230, etc. The controller 270 can communicate with the machine side box conveying subsystem 100, the first sensor 240, the second sensor 250, the central control room, etc., to control and realize the autonomous movement, transferring and exchange of boxes of the AGV box transferring subsystem.

Figure 2:
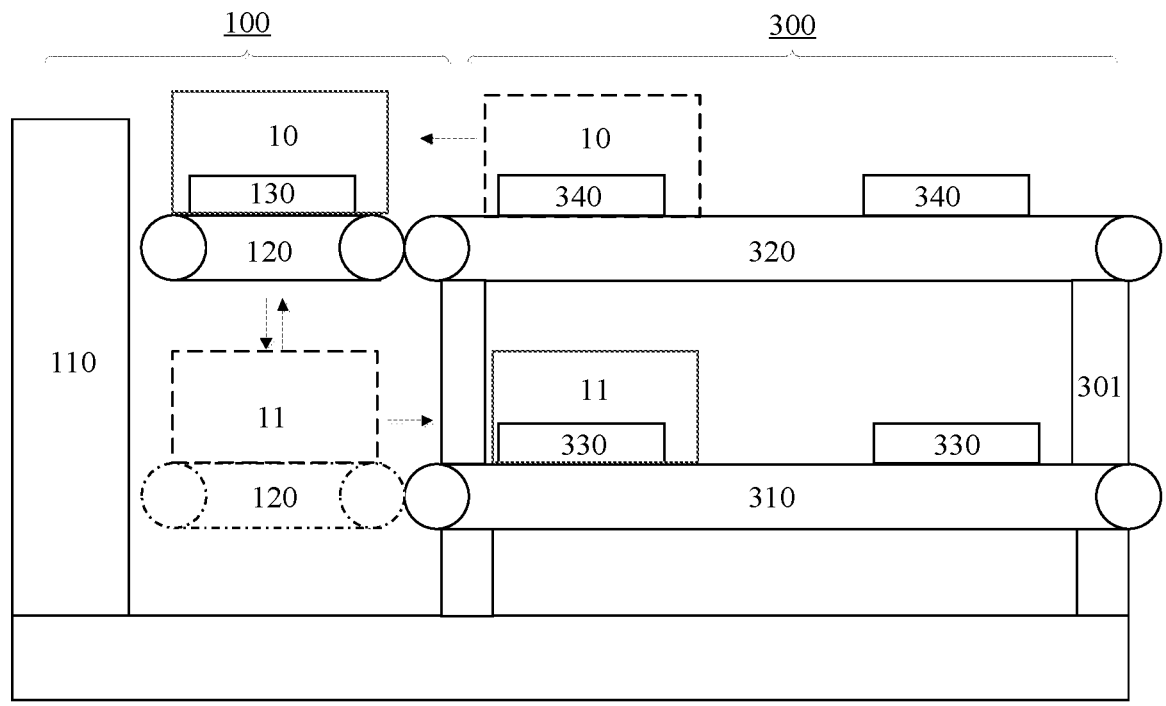
FIG. 2 is a side view schematically showing a partial configuration of a box automatic transferring system according to another exemplary embodiment of the present disclosure.
Figure 3:
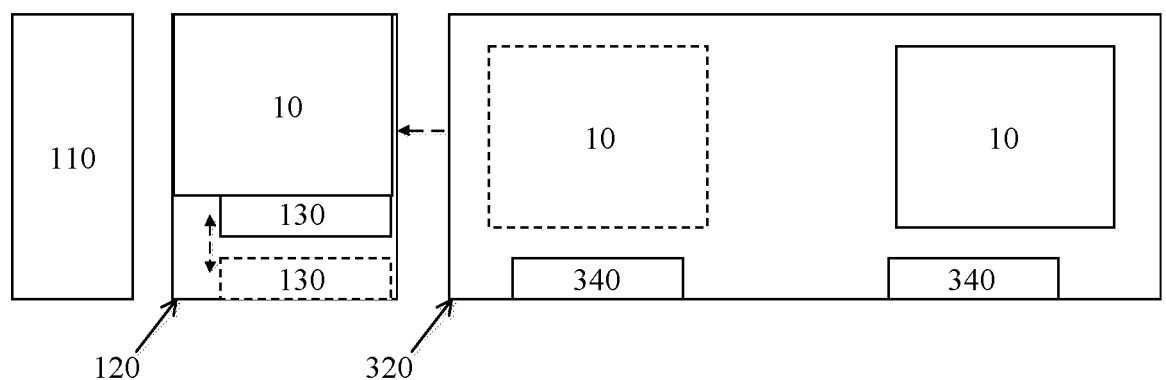
FIG. 3 is a top view schematically showing a partial configuration of a box automatic transferring system according to an exemplary embodiment of the present disclosure.

In an exemplary embodiment according to the present disclosure, as shown in FIGS. 2-4, the box automatic transferring system may also include an intermediate box exchange subsystem 300 configured to receive and hold the empty box 10 and the full box 11, and transfer or exchange boxes between the machine side box conveying subsystem 100 and the AGV box transferring subsystem 200. The intermediate box exchange subsystem 300 is suitable for docking with the machine side box conveying subsystem 100 and the AGV box transferring subsystem 200. For example, the intermediate box exchange subsystem 300 can be arranged near the machine side box conveying subsystem 100 as needed to receive the full box 11 from the machine side box conveying subsystem 100, transfer the full box 11 to the AGV box transferring subsystem 200 as needed, receive the empty box 10 from the AGV box transferring subsystem 200, and transport the empty box 10 to the machine side box conveying subsystem 100 as required.

As an example, the AGV box transferring subsystem 200 may also autonomously move to a second docking position (such as a position near the intermediate box exchange subsystem 300) in response to the absence of empty boxes or the presence of full boxes in the intermediate box exchange subsystem 300 to dock with the intermediate box exchange subsystem 300 and transfer or exchange the boxes.

In addition, it will also be understood that the "docking" described herein can be realized in a variety of ways, including but not limited to mechanical connection or butting, spaced relative positioning, etc., as long as the transport or transfer of boxes between AGV box transferring subsystem, the machine side box conveying subsystem and the intermediate box exchange subsystem can be realized.

In the illustrated embodiment, as shown in FIGS. 2-4, the intermediate box exchange subsystem 300 includes a third box conveyor belt 310 and a fourth box conveyor belt 320. The third box conveyor belt 310 is suitable for receiving and holding the full box 11 from the machine side box conveying subsystem 100, such as from the box buffer 120, and transmitting the full box 11 to the first box conveyor belt 220 as required. The fourth box conveyor belt 320 is adapted to receive and hold the empty box 10 from the second box conveyor belt 230 and transfer the empty box 10 to the machine side box conveying subsystem 100, such as the box buffer 120, as required.

In the illustrated embodiment, the third box conveyor belt 310 and the fourth box conveyor belt 320 are spaced apart in the height direction. If the fourth box conveyor belt 320 is positioned lower than the third box conveyor belt 310, the third box conveyor belt 310 and the fourth box conveyor belt 320 may be supported on the frame 301. In other examples, the third box conveyor belt and the fourth box conveyor belt may be spaced apart in the horizontal direction, or may be spaced apart both in the horizontal direction and the height direction. As an example, the third box conveyor belt 310 is arranged at approximately the same height as the first box conveyor belt 220, and the fourth box conveyor belt 320 is arranged at approximately the same height as the second box conveyor belt 230 to realize the docking between the corresponding conveyor belts and the transfer of boxes. In some examples, the height or horizontal dimensions (e.g. length, width) of the intermediate box exchange subsystem or its box conveyor belt can also be adjusted to adapt different types or sizes of product processing machines, machine side box conveyor subsystems and/or AGV box transferring subsystems.

One or more sensors may be provided to sense the presence or absence of the box on the third box conveyor belt or the fourth box conveyor belt. For example, there may be one or more box positioning positions for placing the box on each box conveyor belt, and sensors may be provided for each box positioning position to sense the presence or absence of the box at the box positioning position. As shown in FIGS. 1 and 4, the third box conveyor belt 310 is provided with a third sensor 330 for sensing the presence of the full box 11 on the third box conveyor belt 310, and/or the fourth box conveyor belt 320 is provided with a fourth sensor 340 for sensing the presence or absence of the empty box 10 on the fourth box conveyor belt 320. When the sensor senses that there are boxes on the third box conveyor belt or at all box positioning positions on the third box conveyor belt, the corresponding third box conveyor belt or third box conveyor belt stops running to prevent the box from falling.

As an example, each of the first to fourth sensors may use any suitable sensor for conventional sensing the presence of an object, such as a photoelectric sensor, a proximity sensor, a distance sensor, etc.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A container transferring system adapted to autonomously transfer a container between a product processing machine and a container storage position, comprising:
   an automated guided vehicle (AGV) container transferring subsystem; and
   a machine side container conveying subsystem adapted to be arranged near the product processing machine and configured to receive an empty container from the AGV container transferring subsystem and transmit a full container in which products processed by the product processing machine are collected to the AGV container transferring subsystem, the AGV container transferring subsystem docking with the machine side container conveying subsystem at a first docking position and moving autonomously between the first docking position and the container storage position to transport the empty container from the container storage position to the machine side container conveying subsystem and transport the full container from the machine side container conveying subsystem to the container storage position, the machine side container conveying subsystem is adapted to receive the empty container from the AGV container transferring subsystem at a first position and transport the full container to the AGV container transferring subsystem at a second position different from the first position, the AGV container transferring subsystem further has an AGV module configured to move autonomously between the first docking position and the container storage position; and at least one container transport mechanism mounted on the AGV module, the at least one container transport mechanism carries and transports the container on it to receive and hold the empty container from the box storage position, transport the empty container to the machine side box conveying subsystem at a third position, and receive and hold the full container from the machine side container conveying subsystem at a fourth position, wherein the third position is at the same height as the first position, and the fourth position is at the same height as the second position, the AGV container transferring subsystem further has a container cover configured to cover the products in the full container carried on the at least one container transport mechanism.

2. The container transferring system according to claim 1, wherein the second position is lower than the first position in a height direction.

3. The container transferring system according to claim 2, wherein the machine side container conveying subsystem includes a lift and a container buffer, the lift is configured to move the container buffer between the first position and the second position, and the container buffer is configured to receive and hold the empty container from the AGV container transferring subsystem and transport the full container to the AGV container transferring subsystem.

4. The box automatic transferring system according to claim 3, wherein the container buffer is further configured to hold the empty container at the second position so that the empty container collects the products processed by the product processing machine and becomes a full container.

5. The container transferring system according to claim 3, wherein the container buffer is provided with a clamping mechanism suitable for holding the container at an appropriate position on the container buffer.

6. The container transferring system according to claim 1, wherein the at least one container transport mechanism comprising:
   a first container conveyor belt adapted to receive and hold the full container from the machine side container conveying subsystem at a fourth position; and
   a second container conveyor belt adapted to transport the empty container to the machine side container conveying subsystem at a third position.

7. The container transferring system according to claim 6, wherein the first container conveyor belt is provided with a first sensor for sensing the full container on the first container conveyor belt, and the second container conveyor belt is provided with a second sensor for sensing the empty container on the second box conveyor belt.

8. The container transferring system according to claim 6, wherein the first container conveyor belt is positioned lower than the second container conveyor belt.

9. The container transferring system according to claim 1, further comprising an intermediate container exchange subsystem configured to receive and hold the empty container and the full container, the intermediate container exchange subsystem is adapted to dock with the machine side container conveying subsystem and the AGV container transferring subsystem to receive the full container from the machine side container conveying subsystem, transport the full container to the AGV container transferring subsystem, receive the empty container from the AGV container transferring subsystem, and transport the empty container to the machine side container conveying subsystem.

10. The container transferring system according to claim 6, further comprising an intermediate container exchange subsystem configured to receive and hold the empty container and the full container, wherein the intermediate container exchange subsystem is adapted to dock with the machine side container conveying subsystem and the AGV container transferring subsystem to receive the full box from the machine side container conveying subsystem, transport the full container to the AGV box transferring subsystem, receive the empty container from the AGV container transferring subsystem, and transport the empty container to the machine side container conveying subsystem.

11. The container transferring system according to claim 10, wherein the intermediate container exchange subsystem comprises:
a third container conveyor belt adapted to receive and hold the full container from the machine side container conveying subsystem and transport the full container to the first container conveyor belt; and
a fourth container conveyor belt adapted to receive and hold the empty container from the second container conveyor belt and transport the empty container to the machine side container conveying subsystem.

12. The container transferring system according to claim 9, wherein the AGV container transferring subsystem is configured to autonomously move to the first docking position to dock with the machine side container conveying subsystem in response to the absence of the empty container or the presence of the full container in the machine side container conveying subsystem.

13. The container transferring system according to claim 12, wherein the AGV container transferring subsystem is configured to autonomously move to the second docking position to dock with the intermediate container exchange subsystem in response to the absence of the empty container or the presence of the full container in the intermediate container exchange subsystem.

14. A handling system, comprising:
a machine side container conveying subsystem including a lifting mechanism moving a container from between a first position and a second position in a vertical direction; and
an automated vehicle including:
a first conveyor belt aligned with the first position for receiving and holding a full container from the machine side container conveying subsystem; and
a second conveyor belt aligned with the second position and positioned directly above the first conveyor belt for transporting an empty container to the machine side container conveying subsystem.

15. The handling system according to claim 14, wherein the first conveyor belt includes a first sensor for sensing the full container on the first conveyor belt, and the second conveyor belt includes a second sensor for sensing the empty container on the second conveyor belt.

16. The handling system according to claim 15, further comprising an intermediate container exchange subsystem receiving and holding the empty container and the full container, and including a third conveyor belt and a fourth conveyor belt adapted to transfer a container between the first conveyor belt and the second conveyor belt, respectively.

17. The container transferring system adapted to autonomously transfer the container between the product processing machine and the container storage position of claim 1, wherein the automated guided vehicle container transferring subsystem directly exchanges the container with the machine side container conveying subsystem.

18. The handling system according to claim 14, wherein a box cover is positioned above the first conveyor belt, such as at a position separated from the first conveyor belt and below the second conveyor belt to cover the products in the full box.

* * * * *